(12) United States Patent
Taherzadeh Boroujeni et al.

(10) Patent No.: US 10,778,385 B2
(45) Date of Patent: Sep. 15, 2020

(54) SYSTEMS AND METHODS FOR SPREADING AND CO-ORTHOGONAL MULTI-STREAM SPREADING

(71) Applicant: Huawei Technologies Co., Ltd., Shenzhen (CN)

(72) Inventors: Mahmoud Taherzadeh Boroujeni, San Diego, CA (US); Alireza Bayesteh, Ottawa (CA); Mohammadhadi Baligh, Ottawa (CA); Jianglei Ma, Ottawa (CA)

(73) Assignee: Huawei Technoloiges Co., Ltd., Shenzhen (CN)

( * ) Notice: Subject to any disclaimer, the term of this patent is extended or adjusted under 35 U.S.C. 154(b) by 0 days.

(21) Appl. No.: 16/119,841

(22) Filed: Aug. 31, 2018

(65) Prior Publication Data

US 2019/0013906 A1 Jan. 10, 2019

Related U.S. Application Data

(63) Continuation of application No. PCT/CN2017/079969, filed on Apr. 10, 2017.

(Continued)

(51) Int. Cl.
  *H04L 5/00* (2006.01)
  *H04L 27/36* (2006.01)
  *H04L 27/26* (2006.01)

(52) U.S. Cl.
  CPC .......... *H04L 5/0016* (2013.01); *H04L 5/0021* (2013.01); *H04L 27/2602* (2013.01); *H04L 27/36* (2013.01); *H04L 27/2614* (2013.01)

(58) Field of Classification Search
  CPC ..... H04L 5/0016; H04L 5/0021; H04L 27/36; H04L 27/2602

(Continued)

(56) References Cited

U.S. PATENT DOCUMENTS

| | | | | |
|---|---|---|---|---|
| 2003/0215023 A1* | 11/2003 | Chang | .................. | H04L 1/0054 375/265 |
| 2011/0199889 A1* | 8/2011 | Han | ........................ | H04J 13/10 370/210 |
| 2016/0204912 A1* | 7/2016 | Sun | ..................... | H04L 27/2613 375/302 |

FOREIGN PATENT DOCUMENTS

| | | | |
|---|---|---|---|
| CN | 105187132 A | 12/2015 | |
| JP | 2009135929 A | 6/2009 | |

(Continued)

OTHER PUBLICATIONS

Hoshyar, Reza, et al., "LDS-OFDM an Efficient Multiple Access Technique," IEEE, Centre for Communication Systems Research, University of Surrey, Jan. 2010. XP055206817, 5 pages.

(Continued)

*Primary Examiner* — Kevin M Burd
(74) *Attorney, Agent, or Firm* — Slater Matsil, LLP

(57) ABSTRACT

Systems and methods are provided for spreading symbols over multiple time-frequency resources that rely on simple base constellations that can be sent over a frequency tone or time slot. A set of input bits (or an input symbol) are mapped to K symbols, and a symbol-to-resource-element mapping is applied that maps the K symbols to resource units. The mapping to the K symbols may be a linear mapping that maps an input symbol to K target tones through a 2K×2 real matrix, where input symbol is a complex point in a base constellation, and is considered as a 2-dimensional real vector. Up to K co-orthogonal 2K×2 real matrices (whose columns are orthogonal to each other) can be associated with the subset of K target tones. Each of the K co-orthogonal matrices can be used for mapping of an independent symbol from a separate steam of symbols which can be associated to a single UE or separate UEs.

26 Claims, 8 Drawing Sheets

Related U.S. Application Data

(60) Provisional application No. 62/321,592, filed on Apr. 12, 2016.

(58) Field of Classification Search
USPC .......................................................... 375/260
See application file for complete search history.

(56) References Cited

FOREIGN PATENT DOCUMENTS

| WO | 2011081809 | A2 | | 7/2011 |
|----|------------|----|----|--------|
| WO | 2014201988 | A1 | | 12/2014 |
| WO | WO-2014201988 | A1 | * | 12/2014 |
| WO | 2015085514 | A1 | | 6/2015 |

OTHER PUBLICATIONS

Nikopour, Hosein, et al., "Sparse Code Multiple Access," IEEE 24th International Symposium on Personal, Indoor and Mobile Radio Communications: Fundamentals and PHY Track, Sep. 2013, XP055227113, 6 pages.

Taherzadeh, Mahmoud, et al., "SCMA Codebook Design," IEEE 80th Vehicular Technology Conference, Sep. 2014, XP032694934, 5 pages.

* cited by examiner

SYSTEMS AND METHODS FOR SPREADING AND CO-ORTHOGONAL MULTI-STREAM SPREADING

CROSS-REFERENCE TO RELATED APPLICATIONS

This application is a continuation of PCT Application No. PCT/CN2017/079969 filed Apr. 10, 2017, which claims the benefit of U.S. Provisional Application No. 62/321,592, filed on Apr. 12, 2016, both of which are hereby incorporated by reference herein as if reproduced in their entirety.

TECHNICAL FIELD

The present disclosure relates generally to digital communications, and more particularly to systems and methods for spreading and co-orthogonal multi-stream spreading and utilization thereof.

BACKGROUND

Spreading of a signal over multiple time/frequency resources is performed for the purpose of achieving higher diversity, reliability and robustness to interference and channel variations.

Code division multiple access (CDMA) is a multiple access technique in which data symbols are spread out over orthogonal or near-orthogonal code sequences. Conventional CDMA encoding is a two-step process in which a binary code is mapped to a quadrature amplitude modulation (QAM) symbol before a spreading sequence is applied. CDMA can be considered a form of repetition of QAM symbols by using different amplitude and phase in accordance with the spreading sequence.

Conventional CDMA encoding can provide relatively high coding rates. However, new techniques/mechanisms for achieving even higher coding rates may be desirable to meet the ever-growing demands of next-generation wireless networks. Low density spreading (LDS) is a form of CDMA used for multiplexing different layers of data. LDS uses repetitions of the same symbol on layer-specific nonzero positions in time or frequency. As an example, in LDS-orthogonal frequency division multiplexing (OFDM) a constellation point is repeated over nonzero frequency tones of an LDS block. This sparse spreading helps reduce the decoding complexity when many (e.g., more than the spreading length) LDS signals are multiplexed together.

SUMMARY

Systems and methods are provided for spreading symbols over multiple time-frequency resources that rely on simple base constellations that can be sent over a frequency tone or time slot. These methods may provide improvements to some of the disadvantages described above.

According to one aspect of the present invention, there is provided a method of transmitting comprising: using an input symbol mapping, mapping a first input symbol to K symbols, where $K>=2$; applying a symbol-to-resource-element mapping to the K symbols; and transmitting on resources according to the symbol-to-resource-element mapping.

In some embodiments, the symbol-to-resource-element mapping maps the K symbols to K tones out of T OFDM tones.

Optionally, for any of the above-summarized embodiments, the first input symbol is a point in a complex plane, and each symbol of the K symbols comprises a point on the complex plane; the input symbol mapping comprises a first mapping that maps a real component of the first input symbol to K real components and K imaginary components of the K symbols, and a second mapping that maps an imaginary component of the input symbol to the K real components and the K imaginary components of the K symbols.

Optionally, for any of the above-summarized embodiments, the method further comprises: modulating a first input bit stream to produce the first input symbol.

Optionally, for any of the above-summarized embodiments, the modulation is performed using QAM modulator with Gray labeling.

Optionally, for any of the above-summarized embodiments, the modulation is performed using QAM modulator with non-Gray labeling.

Optionally, for any of the above-summarized embodiments, the input is a point on a 2B-ary constellation, and each of the K symbols belongs to a respective one-dimensional space consisting of M points, where $2B>=M$.

Optionally, for any of the above-summarized embodiments, applying the symbol-to-resource-element mapping and transmitting comprises transmitting the K symbols using K resources out of T resources, where $2<=K<=T$, and the K resources being defined by a first signature of length T.

Optionally, for any of the above-summarized embodiments, the method further comprises: repeating the input symbol mapping step and the symbol-to-resource-element mapping for another independent input symbol using a different linear mapping.

Optionally, for any of the above-summarized embodiments, the input symbol mapping and symbol-to-resource-element mapping steps are performed by a first transmitter, the method further comprising: in each of a plurality of other transmitters, also performing input symbol mapping and symbol-to-resource-element mapping but using a respective mapping of a corresponding plurality of mappings in place of the input symbol mapping.

Optionally, for any of the above-summarized embodiments, the method further comprises: prior to transmitting the K symbols using K resources out of T resources, multiplying the K symbols by a scrambling sequence, or an interleaving matrix, or a scrambling sequence and an interleaving matrix.

According to another aspect of the present invention, there is provided a method of transmitting comprising: for each of L input symbols, mapping the input symbol to a respective set of K symbols using a respective one of L input symbol mappings, wherein the input symbol is a point on a complex plane, and each symbol of the respective set of K symbols comprises a point in the complex plane; performing symbol-wise combining of the L sets of K symbols to produce a combined set of K symbols; and applying a symbol-to-resource-element mapping to the combined set of K symbols, and transmitting an output of the symbol-to-resource-element mapping.

In some embodiments, each input symbol mapping comprises a first mapping that maps a real component of the input symbol to K real components and K imaginary components of the respective set of K symbols, and a second mapping that maps an imaginary component of the input symbol to the K real components and the K imaginary components of the respective set of K symbols.

Optionally, for any of the above-summarized embodiments, the L mappings are co-orthogonal mappings;

Optionally, for any of the above-summarized embodiments, the method further involves modulating at least one input bit stream to produce the L input symbols.

Optionally, for any of the above-summarized embodiments, applying a symbol-to-resource-element mapping and transmitting comprises transmitting the combined set of K symbols using K resources out of T resources, where $2<=K<=T$, and the K resources being defined by a first signature, and transmitting zeros on the remaining of the T resources.

Optionally, for any of the above-summarized embodiments, the method further comprises in a different transmitter, performing the input symbol mapping, the symbol-to-resource-element mapping, combining and transmitting steps using further mappings for a further set of L input symbols or a different number of input symbols.

Optionally, for any of the above-summarized embodiments, the method further comprises repeating the mapping step for another set of input symbols using a different signature; and combining outputs produced using different signatures prior to transmission.

Optionally, for any of the above-summarized embodiments, K<T and the signature is a sparse signature.

Optionally, for any of the above-summarized embodiments, M=2B and there is a one-to-one mapping between the input and a point on each respective one-dimensional space consisting of M points.

Optionally, for any of the above-summarized embodiments, 2B >M and multiple inputs are mapped to a same point on each respective one-dimensional space consisting of M points.

Optionally, for any of the above-summarized embodiments, an initial mapping is used for one of the K symbols, and for each other of the K symbols a mapping derived from the initial mapping is used.

In some embodiments, the initial mapping uses an initial labelling of constellation points, and for consecutive mappings comprising a previous mapping and a subsequent mapping, for the subsequent mapping a permutation maps $l_i+1^{th}$ labeling to the constellation point which was associated with the $l_i^{th}$ label in the previous mapping, where $l_i+1=r \times l_i \mod 2B$, where r is a primitive root of 2B.

Optionally, for any of the above-summarized embodiments, the K resources out of T possible resources comprise K tones out of T OFDM tones.

According to yet another aspect of the present invention, there is provided an apparatus comprising: an input symbol mapper configured to map a first input symbol to K symbols, where K>=2; a symbol-to-resource-element mapper configured to apply a symbol-to-resource-element mapping to the K symbols; a transmitter configured to transmit an output of the symbol-to-resource-element mapping.

In some embodiments, the symbol-to-resource-element mapper and transmitter are configured to transmit the K symbols using K resources out of T resources, where $2<=K<=T$, and the K resources being defined by a first signature of length T.

Optionally, for any of the above-summarized embodiments, the first input symbol is a point in a complex plane, and each symbol of the K symbols comprises a point on the complex plane; the input symbol mapping applied by the input symbol mapper comprises a first mapping that maps a real component of the first input symbol to K real components and K imaginary components of the K symbols, and a second mapping that maps an imaginary component of the input symbol to the K real components and the K imaginary components of the K symbols.

BRIEF DESCRIPTION OF THE DRAWINGS

Examples of embodiments of the invention will now be described in greater detail with reference to the accompanying drawings in which.

DETAILED DESCRIPTION OF ILLUSTRATIVE EMBODIMENTS

Figure 1A:
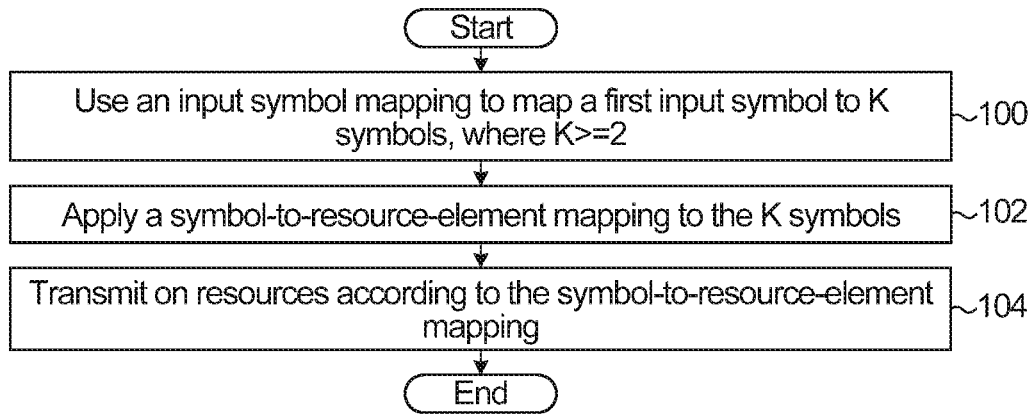
FIGS. 1A and 1B are flowcharts of methods of spreading provided by embodiments of the invention.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the application.

In this disclosure, methods are provided for spreading symbols over multiple time-frequency resources that rely on simple base constellations that can be sent over a frequency tone or time slot. These methods may provide improvements over LDS, such as some of the benefits associated with SCMA.

In a first embodiment, sequences of symbols are generated based on an input of a block of bits and user equipment (UE)-dependent mappings (sometimes called a spreading sequence or signature) map the block of bits to a symbol sequence. Different symbols of each sequence can be sent over orthogonal communication units such as time units (e.g. time slots) or frequency units (e.g. tones). Different sequences can overlap over the available communication resources (e.g. time units or frequency units).

This may be achieved in two steps: a first step that maps the input bits that may be coded bits (or a point on a constellation) to K symbols, and a symbol-to-resource-element mapping that maps the K symbols to resource units. In a specific example, a method provided by another embodiment of the invention involves mapping a base symbol (which can be from QAM or PAM or PSK or any one-dimensional complex constellation) to a sequence of symbols through a combination of a sparse signature (which shows the position of target tones among the available tones) and a linear mapping that maps the input symbol to the K target tones through a 2K×2 real matrix, where the complex point in the base constellation is considered as a 2-dimensional real vector. Up to K co-orthogonal 2K×2 real matrices (whose columns are orthogonal to each other) can be associated with the subset of K target tones. Each of the K co-orthogonal matrices can be used for mapping an independent symbol from a separate steam of symbols which can be associated to a single UE or separate UEs. More generally, the linear mapping is a symbol-to-resource-element mapping.

Equivalently, wherever a 2K×2 matrix or mapping is described herein that maps real and imaginary components of an input symbol to K real components and K imaginary components (a total of 2K components) of the K symbols, a first mapping (for example, a 2K×1 mapping) can be applied to the real component and a second mapping (for example, a 2K×1 mapping) can be applied to the imaginary component, and the results of these two mappings are added together.

The spreading sequences can have nonzero symbols over all the available resource units (e.g. available frequency tones) or only a subset of them (e.g., using sparse spreading).

In some embodiments, a spreading sequence of length T maps an input of B bits to a sequence of T symbols, where K of the T symbols are chosen from a base constellation (like a QAM or PSK or PAM or any other one-dimensional complex constellation which can be sent over a frequency tone or a time slot) and the rest of the T symbols are zeros.

The criteria for designing the symbol sequences can include maximizing the Euclidean distance among different sequences and/or other distance metrics that show dependency among symbols associated with the same bits (for example the product distance). Also, in the case of transmitting over OFDM tones, lowering PAPR by restricting the combinations of nonzero symbols can be a design criterion.

When the number of tones is large, a simple sub-optimal method for increasing the minimum Euclidean distance may be employed by permutations of labeling through pseudo-random generating methods. An example of this starts with the B-bit sequences of bits being numbered 0, 1, ..., 2B-1. An example of relabeling through pseudo-random generation is to start with an initial labeling for the first tone and for the consecutive tones (among the nonzero tones), and using a repetitive permutation that maps $l_i+1^{th}$ labeling to the constellation point which was associated with the $l_i^{th}$ label in the previous tone, where $l_i+1=r\times l_i$ mod 2B, where r is a primitive root of 2B. It should be noted that more than one label can be associated to a constellation point.

As a special case for sparse spreading, the spreading sequences can be constructed by a sequences of ones and zeros of length T (that shows the position of K nonzero tones) and a single mapping that maps a block of B bits to K symbols from the base constellation that are sent over K nonzero tones.

In some embodiments, detection of the bits in a receiver is done by a message-passing algorithm (MPA) similar to the case of LDS and SCMA.

FIG. 1A is a flowchart of a method of transmitting provided by an embodiment of the invention. The method begins in block 100 with using an input symbol mapping to map a first input symbol to K symbols, where K>=2. The method continues in block 102 with applying a symbol-to-resource-element mapping to the K symbols, and transmitting an output of the symbol-to-resource-element mapping in block 104.

With this embodiment, the symbols are generated in two steps—a first step maps an input symbol to K symbols, and a second step maps the K symbols to resource units. Block 100 may, for example, map an input comprising a point on a 2B-ary constellation mapped to K symbols, each symbol comprising a point on a respective one-dimensional complex consisting of M points, where 2B>=M.

In some embodiments, the initial input is a set of B input bits from an input bit stream. The B input bits can be directly mapped to the K symbols, or there is an additional step (not shown) of first mapping the B input bits to a constellation point, for example QAM modulation, to produce a point on a 2B-ary constellation. The mapping of the point on the 2B-ary constellation to the K symbols is a 2K×2 linear mapping that maps the real and imaginary components of the point on the 2B-ary constellation to K real and K imaginary components of the K symbols. The constellation is one dimensional in the sense that the points lie in a single complex plane, so there is a single complex dimension, although the single dimension includes real and imaginary components.

In a specific example of block 102, in which the transmitter applies a symbol-to-resource-element mapping to the K symbols, and transmits an output of the symbol-to-resource-element mapping, the transmitter transmits the K symbols using K resources out of T resources, where 2<=K<=T, and the K resources being defined by a signature of length T. In the case of OFDM transmission, this can, for example, involve extra steps such as an inverse fast Fourier transform (IFFT) to map the K symbols in the frequency domain to a time domain output. The K resources out of T possible resources may, for example, be K tones out of T OFDM tones.

In some embodiments, K is as large as T. In other embodiments, K is smaller than T and optionally much smaller. In some embodiments the signature is a sparse signature. In some embodiments, 2B=M and there is a one-to-one mapping between the input and one of the M points. In other embodiments, 2B>M and multiple inputs are mapped to a same point on at least one symbol. For example, if B is 3 and M is 4, then two inputs would be mapped to each point in the constellation.

In some embodiments, an initial mapping is used for one of the K symbols. For each other of the K symbols a mapping derived from the initial mapping is used.

In some embodiments, the initial mapping uses an initial labelling of constellation points, and for consecutive mappings comprising a previous mapping and a subsequent mapping, for the subsequent mapping a permutation maps $l_i+1^{th}$ labeling to the constellation point which was associated with the $l_i^{th}$ label in the previous mapping, where $l_i+1=r\times l_i$ mod 2B, where r is a primitive root of 2B.

Figure 1B:
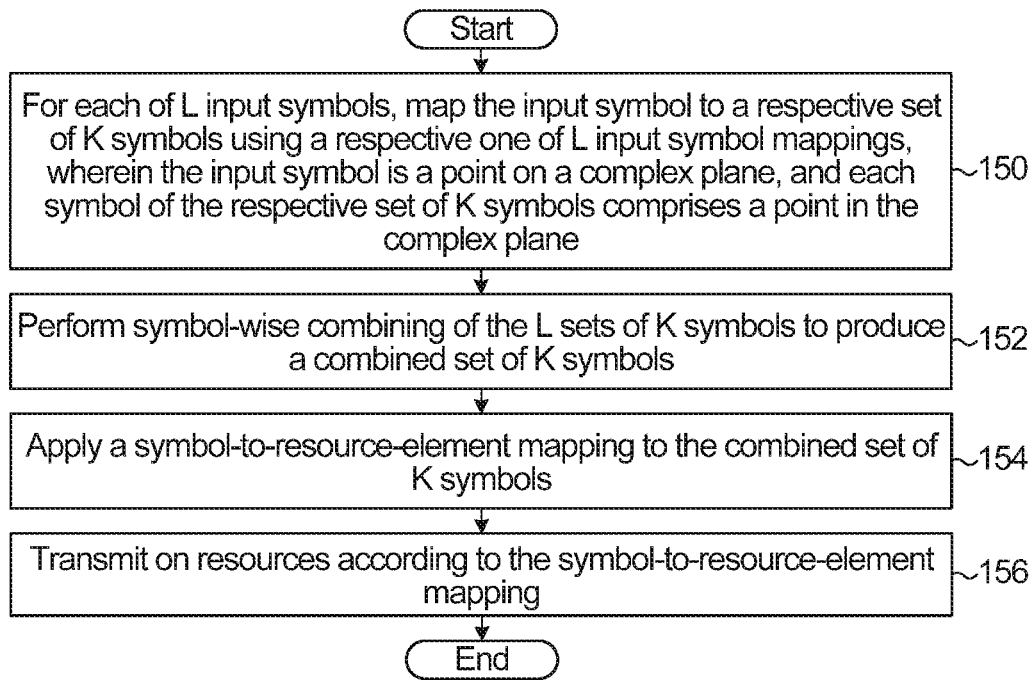

In some embodiments, a method similar to that of FIG. 1A is employed, in which mappings are applied to sets of L input symbols of an input symbol stream, where L≤2. FIG. 1B is a flowchart of such a method of transmitting provided by another embodiment of the invention. Although this embodiment is described as featuring a mapping for each of L input symbols, in another embodiment, the input is L sets of B input bits which are first converted to the L input symbols, as per the previously described embodiment.

The method of FIG. 1B begins in block 150 with, for each of L input symbols, mapping the input symbol to a respective set of K symbols using a respective one of L input symbol mappings, wherein the input symbol is a point on a complex plane, and each symbol of the respective set of K symbols comprises a point in the complex plane. In block 152, symbol-wise combining of the L sets of K symbols is performed to produce a combined set of K symbols. In block 154, a symbol-to-resource-element mapping is applied to the combined set of K symbols, and an output of the symbol-to-resource-element mapping is transmitted in block 156.

Optionally, applying a symbol-to-resource-element mapping and transmitting comprises transmitting the combined set of K symbols using K resources out of T resources, where $2<=K<=T$, and the K resources being defined by a first signature, and transmitting zeros on the remaining of the T resources.

Figure 2:
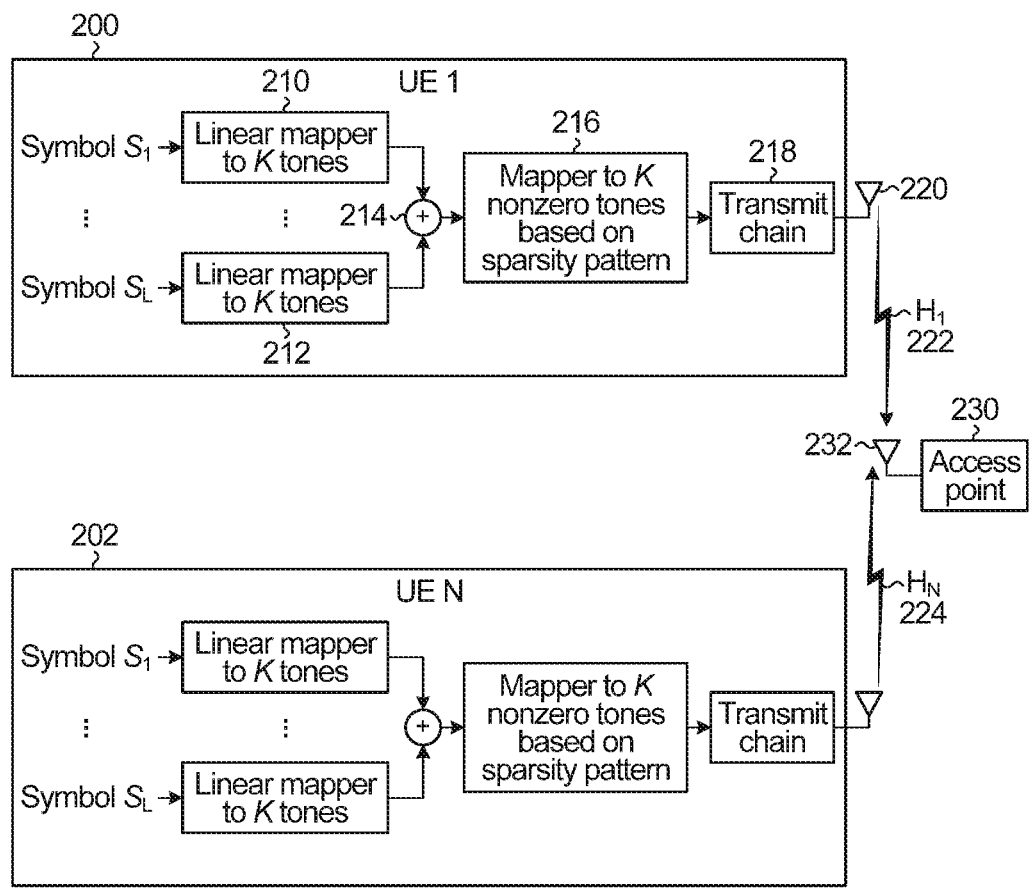
FIG. 2 is a block diagram of a sparse co-orthogonal spreading system for uplink transmission.

FIG. 2 is a block diagram of a sparse co-orthogonal spreading system for uplink transmission provided by an embodiment of the invention. This embodiment is based on the method of FIG. 1B, where the method of FIG. 1B is being performed by multiple UEs. Shown is functionality for a first UE 200 and an Nth UE 202 out of N UEs. The functionality of the UEs is the same so only the first UE 200 will be described. L input symbols S1, . . . , $S_L$ are input to respective linear mappers 210, . . . , 212 that map each input to K tones. The outputs of the mappers 210, 212 are combined at 214. The combined output is mapped to K nonzero tones based on a sparsity pattern in mapper 216. More generally, a symbol to resource mapper can be provided in place of mapper 216. The output of the mapper 216 is passed to a transmit chain 218 which generates a signal for transmission over one or more antennas 220. The system of FIG. 2 is a co-orthogonal spreading system in the sense that the mapping functions applied on the real and imaginary components of input symbols S1, . . . , $S_L$ are orthogonal to each other.

An access point 230 receives a signal on one or more antennas 232. The received signal contains a component due to the signal transmitted from the first UE 200 after the signal experiences channel H1, and contains a component due to a signal transmitted from the Nth UE 202 after that signal experiences channel HN, and corresponding components from other UEs (not shown).

Figure 3:
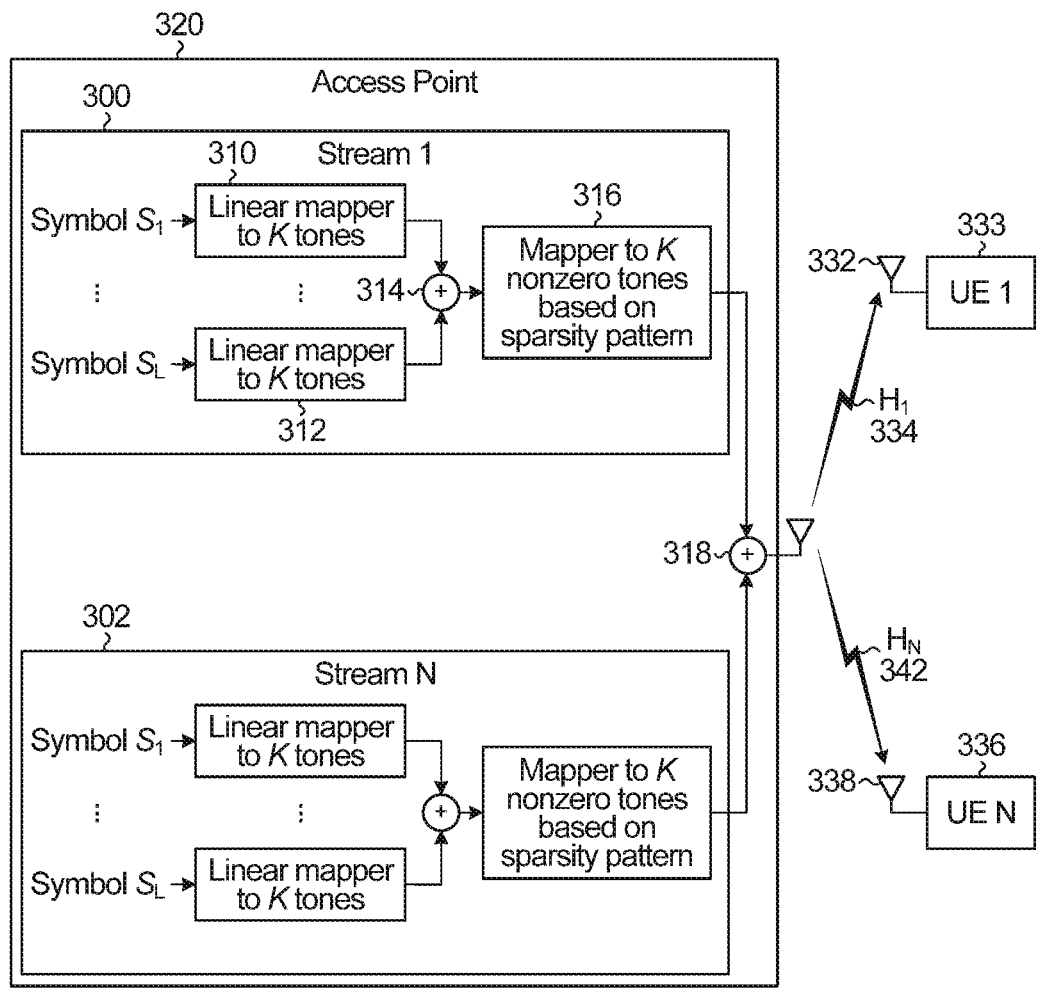
FIG. 3 is a block diagram of a sparse co-orthogonal spreading system for downlink transmission.

FIG. 3 is a block diagram of a sparse co-orthogonal spreading system for downlink transmission provided by an embodiment of the invention. This embodiment is also based on the method of FIG. 113, where the method of FIG. 1B is being performed for multiple streams for transmission by an access point to multiple UEs. Shown is functionality within an access point 320 for a first stream 300 and an $N^{th}$ stream 302 out of N streams. The functionality for the streams is the same so only the first stream 300 will be described. L input symbols S1, . . . , $S_L$ are input to respective linear mappers 310, . . . , 312 that map each input to K tones. The outputs of the mappers 310, 312 are combined at 314. The combined output is mapped to K nonzero tones based on a sparsity pattern in mapper 316. More generally a symbol to resource mapper can be provided in place of mapper 316. The output of the mapper 316 is passed to combiner 318 where it is combined with corresponding outputs for the other streams 302 and then transmitted over one or more antennas 320.

A first UE 330 receives the transmitted signal on one or more antennas 332 after the signal experiences channel H1. Similarly, an $N^{th}$ UE 336 receives the transmitted signal on one or more antennas 338 after the signal experiences channel H2.

In some embodiments, the input symbols in FIGS. 2 and 3 are generated using QAM modulation with Gray labeling or with any other labeling method.

It is noted that the linear mapping to K tones in FIGS. 2 and 3 is equivalent to an implementation of symbol-level spreading, where the spreading is performed on each real and imaginary component of the input symbol separately.

In some embodiments, the co-orthogonal spreader is preceded by bit level spreading, serial to parallel conversion, and modulators. A specific example is described below with reference to FIGS. 7 and 8.

Optionally, for any of the embodiments described herein, prior to transmitting the K symbols using K resources out of T resources (more generally prior to performing a symbol-to-resource-element mapping), the K symbols are multiplied by a scrambling sequence, or an interleaving matrix, or a scrambling sequence and an interleaving matrix. The symbols output by the scrambling and/or interleaving operation are then transmitted using K resources out of T resources.

Although the embodiments of FIGS. 2 and 3 feature a mapping of symbols to resource elements that is based on a sparsity pattern, more generally, as noted previously, in other embodiments, any symbol-to-resource-element mapping can be employed.

The choice of sparse signatures (which are associated with a group of symbol streams and can be assigned to a UE or multiple UEs) can be based only on the sparsity criterion to simplify the usage of MPA in detection (i.e. any subset of tones of size K can be a signature) or the signatures can be chosen from a set of o and 1 sequences that have additional properties other than sparsity. Examples of more restricted sets of sparse signatures are the optical orthogonal codes (OOCs) which, in addition to sparsity, have limits on the nonzero overlapping among them.

Similarly to LDS and SCMA, detection of the symbols and the associated bits can be done using MPA, which iteratively converges to the maximum likelihood detection. As a simpler approximate solution, the linearity of the mappings for each stream facilitates the usage of linear detection methods such as MMSE.

Figure 4:
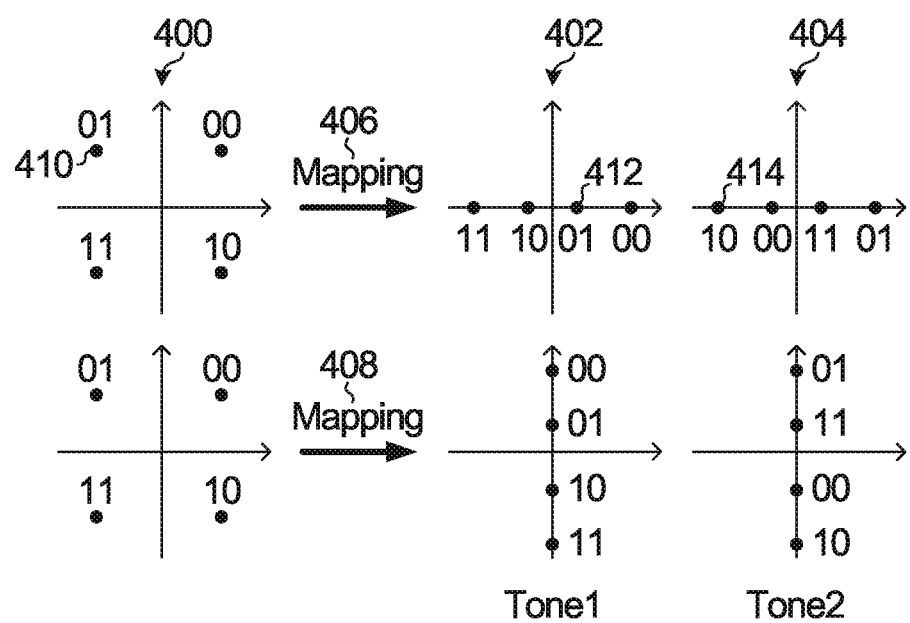
FIG. 4 is an example of co-orthogonal mappings for two tones.

A first example of a simple co-orthogonal mapping (to be used for transmission from the same transmitter) is shown in FIG. 4 for K=2. Shown is a constellation 400 with four points, each representing two bits. Constellation 400 is mapped with a first mapping 406 to K=2 tones having respective constellations 402, 404. In a specific example, constellation point 410 representing bits "10" is mapped to constellation points 412, 414 of constellations 402, 404 respectively. Also shown is a second mapping 408 that is co-orthogonal to the first mapping 406.

Figure 5:
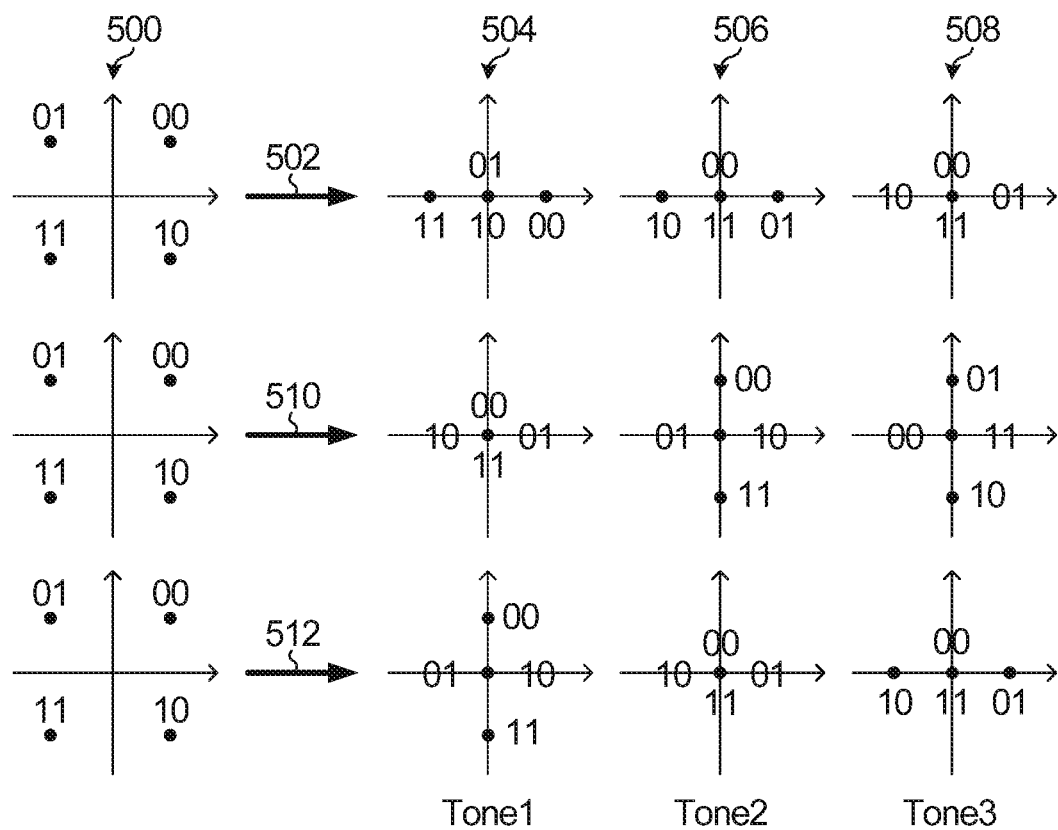
FIG. 5 is an example of co-orthogonal mappings for three tones.

A second example of a simple co-orthogonal mapping (to be used for transmission from the same transmitter) is shown in FIG. 5 for K=3. Shown is a constellation 500 with four points, each representing two bits. Constellation 500 is mapped with a first mapping 502 to K=3 tones having respective constellations 504, 506, 508. Also shown are second and third mappings 510, 512 that are co-orthogonal to the first mapping 502.

Returning now to FIG. 1A, blocks 100, 102 of the method of FIG. 1A involve transmission of a single symbol, using a single signature. In another embodiment, the illustrated steps are repeated to transmit multiple symbols using the same single signature, with co-orthogonal mappings used for the multiple symbols. The functionality for UE 200 in FIG. 2 is an example of this.

In some embodiments, the method of FIG. 1A is repeated by the same transmitter for another independent input symbol or group of symbols using a different signature. The functionality of FIG. 3 is an example of this. This would be suitable for downlink transmission.

In some embodiments, the method of FIG. 1A is performed by multiple transmitters each using a different signature. The functionality of UEs 200, . . . , 202 in FIG. 2 is an example of this.

In another embodiment, the same signature is used for the multiple transmitters, each transmitter using different co-orthogonal mappings. Up to a total of K co-orthogonal mappings can be assigned across up to K transmitters. Where multiple signatures are available for a set of transmitters, for example P signatures, K co-orthogonal mappings can be employed for each signature for a total of P×K symbol transmission opportunities which can be allocated across the set of transmitters.

Each mapping is a 2K×2 linear mapping that maps two components consisting of real and imaginary components of an input symbol to 2K components consisting of K real components and K imaginary components of K symbols. As discussed above, where multiple mappings for the same signature are used, the mappings are co-orthogonal mappings.

When a single transmitter is to transmit multiple symbols using the same signature, symbol-wise combining of the L sets of K symbols is performed to produce a combined set of K symbols, and the combined set of set of K symbols are transmitted using K resources out of T resources, where 2<=K<=T, and the K resources being defined by a first signature, and transmitting zeros on the remaining ones of the T resources.

Non-orthogonal multiple access (NoMA) generally allows multiple signals to be transmitted from one or more transmitters to one or more receivers simultaneously on a given shared resource. The shared resource may include a time resource, a frequency resource, a space resource or some combination thereof. In a downlink (DL) scenario, a network side device can transmit to multiple separate user equipments (UEs). In an uplink (UL) scenario multiple UEs can transmit to a network side receiver.

In the UL NoMA scenario, the UEs process information bits arranged in one or more layers to become symbols for transmission on multiple tones. In NoMA, there are likely to be collisions of symbols from the multiple UEs at the receiver that receives the signals. A NoMA technique may attempt to distinguish the transmitted signals from the multiple UEs by applying some UE specific or layer-specific features that are unique to the UE or layer, respectively. These features may include, but are not limited to: forward error correction (FEC) encoding; bit-level interleaving, scrambling; modulated symbol sequence generator; and symbol to RE mapping.

Distinct multiple access schemes can be developed based on such UE-specific or layer specific (or both) signal processing operations. These signal processing operations may include, but are not limited to: FEC, bit-level interleaving, scrambling; modulated symbol sequence generator; and symbol to RE mapping.

A framework is proposed for generating a NoMA signal based on selection of a particular set of signal processing operations. The set of signal processing operations are then used to process information bits and generate the NoMA signal for transmission. Various NoMA schemes that each includes a different subset of the signal processing operations can be derived using the framework. Such a framework can be used by a UE to select a NoMA scheme having a set of signal processing operations that meets a desired transmission application.

Figure 6:
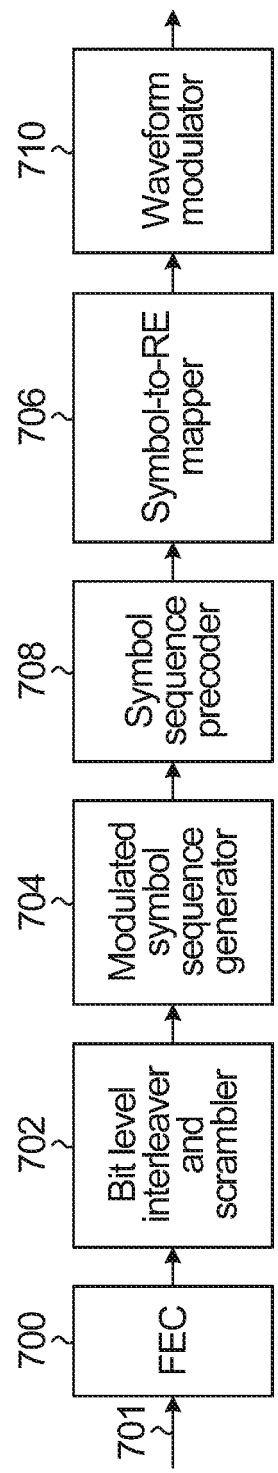
FIG. 6 is a schematic diagram showing an example framework that may be used to define a variety of non-orthogonal multiple access (NoMA) schemes according to an aspect of the application.

FIG. 6 illustrates an example of a collection of signal processing operations that may be part of a framework 700 for generating a NoMA signal, which includes units to function as FEC 700, bit-level interleaver and scrambler 702, modulated symbol sequence generator 704, symbol sequence precoder 708, symbol to RE mapping 705, and waveform modulator 710.

Step 1: A stream of information bits 701 is provided to perform forward error correction (FEC) encoding 700. Within the FEC module, information bits are processed with FEC channel code. One example is a block of K information bits are coded and N coded bits are generated, and N>K.

Step 2: The encoded bit is then provided to bit-level interleaver and scrambler 702 for bit-level interleaving and scrambling In the bit-level interleaver and scrambler 702, the coded bits are interleaved and scrambled, and interleaved and scrambled bits are generated. The bit-level interleaver and scrambler can be UE-specific, i.e., each UE has a specific interleaver and scrambler, or cell-specific, i.e., the UEs in each cell apply a specific interleaver and scrambler. In another embodiment, only interleaving is performed, in which case the interleaver and scrambler 702 is replaced with an interleaver. In another embodiment, only scrambling is performed, in which case the interleaver and scrambler 702 is replaced with a scrambler.

Step 3: An output of coded bits from the bit-level interleaver and scrambler 702 is provided to the modulated symbol sequence generator 704. The modulated symbol sequence generator 704 generates symbols from the coded bits. In the modulated symbol sequence generator 704, the interleaved/scrambled bits are mapped to modulated symbols, with or without additional symbol-level spreading operations. The bit-to-symbol mapping can be one or multiple bits to one or multiple symbols. The symbol-level spreading is to multiply the symbols with spreading codes, which may include one or multiple stages, and the length of spreading code can be different at each stage.

Step 4 (optional): An output of the modulated symbol sequence generator 704 is provided to symbol sequence precoder 708 that performs symbol pre-coding. The modulated symbols sequence may be applied to a symbol sequence precoder 708. This is mainly for reducing the PAPR of the transmitted signal that may improve coverage of the transmitted signal. In the case of OFDM waveform, DFT precoding might be used.

Step 5: An output of the symbol sequence precoder 708 is provided to the symbol-to-resource-element (RE) mapper 706. The modulation symbols are mapped to the resource elements for transmission, with or without additional symbol-level interleaving/scrambling. The symbol-level interleaver/scrambler can be UE-specific, i.e., each UE has a symbol-level specific interleaver/scrambler, or cell-specific, i.e., the UEs in each cell apply a symbol-level specific interleaver/scrambler.

Step 6: waveform modulator 710: after generating the symbols and mapping them to the REs, the waveform generator block will generate the actual signal to be transmitted over the air.

Figure 7:
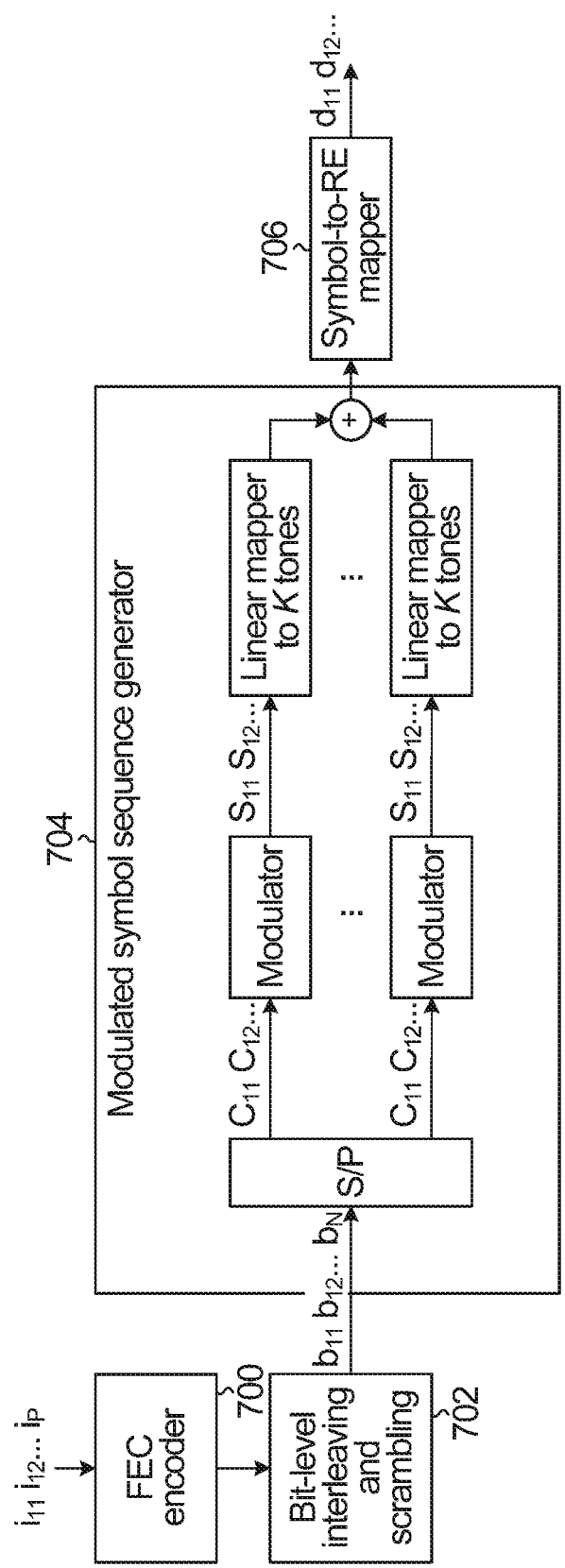
FIG. 7 is a block diagram of a system based on FIG. 6 in which one of the methods provided by embodiments of the invention is implemented in the modulated symbol sequence generator.

FIG. 7 is a block diagram of a transmitter showing the components of FIG. 6, commonly numbered, and in which the co-orthogonal mapping embodiment described above is implemented in the modulated symbol sequence generator 704.

Figure 8:
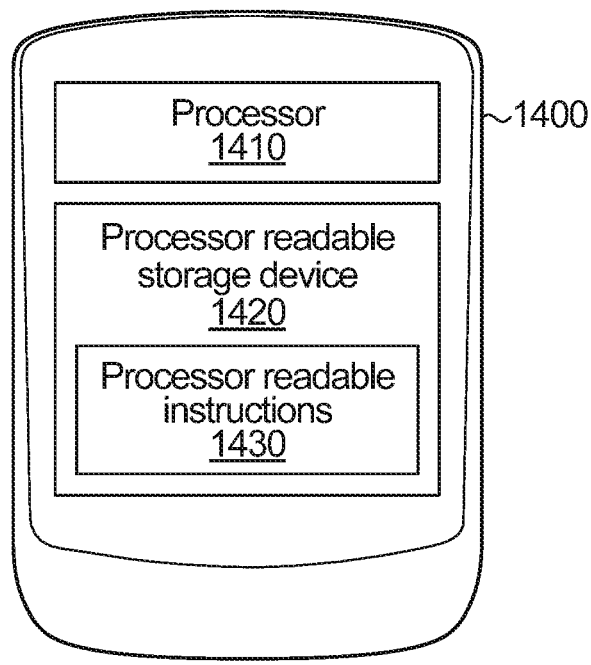
FIG. 8 is a block diagram of an example apparatus for transmitting a NoMA signal according to an aspect of the application.

FIG. 8 is a block diagram of an example apparatus 1400 for transmission of a NoMA signal in accordance with one of the embodiments described herein. The example apparatus 1400 may be a UE and thus have various elements that would normally be a part of such an apparatus, such as a key pad, display screen, speaker, microphone, etc. The example apparatus 1400 includes a processor 1410 and a processor readable storage device 1420. The processor readable storage device 1420 has stored thereon processor executable instructions 1430 that when executed by the processor cause the processor to perform a method consistent with the methods described above.

Figure 9:
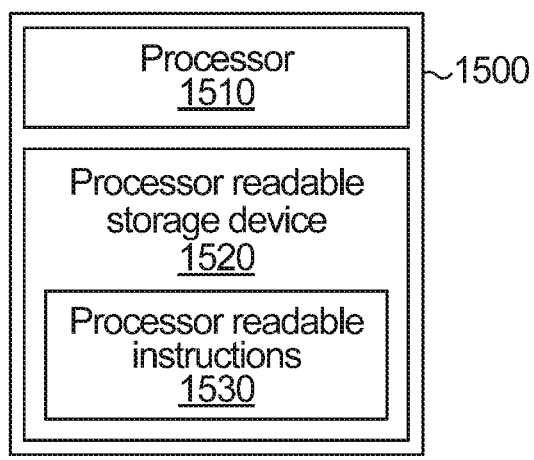
FIG. 9 is a block diagram of an example apparatus for receiving a NoMA signal according to an aspect of the application.

FIG. 9 is a block diagram of an example apparatus 1500 for receiving a NoMA signal in accordance with one of the embodiments described herein. The example apparatus may be a network side device, such as base station, or access point, capable of receiving and decoding the NoMA signal. Such a network side device may include physical structure for performing other network side tasks and be located anywhere within the network that allows the device to operate accordingly. The example apparatus 1500 includes a processor 1510 and a processor readable storage device 1520. The processor readable storage device 1520 has stored thereon processor executable instructions 1530 that when executed by the processor cause the processor to implement a method for receiving one or more NoMA signals form one or more transmitters and decode the one or more NoMA signals.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

In some embodiments, the described encoding methods are implemented within the modulated symbol sequence generator 704 as illustrated in FIG. 8.

Further embodiments comprise a transmitter or group of transmitters configured to implement one of the above described methods. Further embodiments comprise a receiver or group of receivers configured to receive signals transmitted in accordance with one of the above described methods.

Although the present disclosure and its advantages have been described in detail, it should be understood that various changes, substitutions and alterations can be made herein without departing from the spirit and scope of the disclosure as defined by the appended claims.

What is claimed is:

1. A method of transmitting comprising:
using an input symbol mapping, mapping a first input symbol to K symbols, the first input symbol being a point on a 2B-ary constellation, each of the K symbols belonging to a respective one-dimensional constellation consisting of M points, where $K>=2$ and $2B>=M$;
applying a symbol-to-resource-element mapping to the K symbols; and
transmitting on resources according to the symbol-to-resource-element mapping.

2. The method of claim 1, wherein the symbol-to-resource-element mapping maps the K symbols to K tones out of T OFDM tones.

3. The method of claim 1,
wherein the input symbol mapping comprises a first mapping that maps a real component of the first input symbol to K real components and K imaginary components of the K symbols, and a second mapping that maps an imaginary component of the first input symbol to the K real components and the K imaginary components of the K symbols.

4. The method of claim 1, further comprising:
modulating a first input bit stream to produce the first input symbol.

5. The method of claim 4, wherein the modulation is performed using QAM modulator with Gray labeling.

6. The method of claim 4, wherein the modulation is performed using QAM modulator with non-Gray labeling.

7. The method of claim 1, further comprising repeating the using the input symbol mapping and the applying the symbol-to-resource-element mapping for another independent input symbol using a different linear mapping.

8. The method of claim 1, wherein the using the input symbol mapping and the applying the symbol-to-resource-element mapping are performed by a first transmitter, the method further comprising:
in each of a plurality of other transmitters, also performing input symbol mapping and symbol-to-resource-element mapping but using a respective mapping of a corresponding plurality of mappings in place of the input symbol mapping.

9. The method of claim 1, wherein applying the symbol-to-resource-element mapping and transmitting comprises transmitting the K symbols using K resources out of T resources, where $2<=K<=T$, and the K resources being defined by a first signature of length T.

10. The method of claim 9, further comprising:
prior to transmitting the K symbols using the K resources out of the T resources, multiplying the K symbols by a scrambling sequence, or an interleaving matrix, or a scrambling sequence and an interleaving matrix.

11. A method of transmitting comprising:
for each of L input symbols, mapping the input symbol to a respective set of K symbols using a respective one of L input symbol mappings, wherein the input symbol is a point on a 2B-ary complex plane, and each symbol of the respective set of K symbols belonging to a respective one-dimensional constellation consisting of M points, wherein both L and K are positive integer numbers, $2B>=M$, and $K>=2$;
performing symbol-wise combining of the L sets of K symbols to produce a combined set of K symbols; and
applying a symbol-to-resource-element mapping to the combined set of K symbols, and transmitting an output of the symbol-to-resource-element mapping.

12. The method of claim 11, wherein each input symbol mapping comprises a first mapping that maps a real component of the input symbol to K real components and K imaginary components of the respective set of K symbols, and a second mapping that maps an imaginary component of the input symbol to the K real components and the K imaginary components of the respective set of K symbols.

13. The method of claim 12, wherein the L mappings are co-orthogonal mappings.

14. The method of claim 12, further comprising:
modulating at least one input bit stream to produce the L input symbols.

15. The method of claim 14, wherein $K<T$, T being a positive integer number.

16. The method of claim 15, wherein $M=2B$, and wherein there is a one-to-one mapping between the input symbol and one of the M points.

17. The method of claim 15, wherein 2B>M, and wherein multiple inputs are mapped to a same point from the M points.

18. The method of claim 17, wherein an initial mapping is used for one of the respective sets of K symbols, and a mapping derived from the initial mapping is used for each of the other respective sets of K symbols.

19. The method of claim 18, wherein the initial mapping uses an initial labelling of a constellation point, and for consecutive mappings comprising a previous mapping and a subsequent mapping, for the subsequent mapping a permutation maps an $l_{i+1}$-th labeling to the constellation point which was associated with an $l_i$th label in the previous mapping, where $l_{i+1}$ mod 2B, where r is a primitive root of 2B.

20. The method of claim 11, further comprising:
repeating the mapping for another set of input symbols using a different signature; and
combining outputs produced using different signatures prior to transmission.

21. The method of claim 11, wherein applying a symbol-to-resource-element mapping and transmitting comprises transmitting the combined set of K symbols using K resources out of T resources, where $2<=K<=T$, and the K resources being defined by a first signature, and transmitting zeros on the remaining of the T resources.

22. The method of claim 21, further comprising:
in a different transmitter, performing the input symbol mapping, the symbol-to-resource-element mapping, combining and transmitting using further mappings for a further set of L input symbols or a different number of input symbols.

23. The method of claim 21, wherein the K resources out of T possible resources comprise K tones out of T OFDM tones.

24. A device comprising:
a non-transitory memory storage comprising instructions; and
a processor in communication with the non-transitory memory storage, wherein the processor execute the instructions to:
use an input symbol mapping to map a first input symbol to K symbols, the first input symbol being a point on a 2B-ary constellation, each of the K symbols belonging to a respective one-dimensional constellation consisting of M points, where $K>=2$ and $2B>=M$;
apply a symbol-to-resource-element mapping to the K symbols; and
transmit an output of the symbol-to-resource-element mapping on resources.

25. The device of claim 24, wherein the instructions to transmit the output of the symbol-to-resource-element mapping on the resources comprise instructions to transmit the K symbols using K resources out of T resources, wherein $2<=K<=T$, the K resources being defined by a first signature of length T.

26. The device of claim 24, wherein
the input symbol mapping comprises a first mapping that maps a real component of the first input symbol to K real components and K imaginary components of the K symbols, and a second mapping that maps an imaginary component of the first input symbol to the K real components and the K imaginary components of the K symbols.

* * * * *

UNITED STATES PATENT AND TRADEMARK OFFICE
CERTIFICATE OF CORRECTION

PATENT NO. : 10,778,385 B2  
APPLICATION NO. : 16/119841  
DATED : September 15, 2020  
INVENTOR(S) : Taherzadeh Boroujeni Page 1 of 1

It is certified that error appears in the above-identified patent and that said Letters Patent is hereby corrected as shown below:

In the Claims

In Column 13, Line 13, Claim 19, delete "$l_ith$" and insert --$l_i$-th--.

In Column 13, Line 14, Claim 19, delete "$l_{i+1}$ mod 2B" and insert --$l_{i+1} = r \times l_i$ mod 2B--.

Signed and Sealed this  
First Day of December, 2020

Andrei Iancu  
*Director of the United States Patent and Trademark Office*